United States Patent [19]
Garrison et al.

[11] Patent Number: 5,959,626
[45] Date of Patent: Sep. 28, 1999

[54] METHOD AND APPARATUS FOR MANIPULATING VERY LONG LISTS OF DATA DISPLAYED IN A GRAPHICAL USER INTERFACE USING A LAYERED LIST MECHANISM

[75] Inventors: John Michael Garrison; Gale Arthur Wilson, both of Austin, Tex.

[73] Assignee: International Business Machines Corporation, Armonk, N.Y.

[21] Appl. No.: 08/859,943

[22] Filed: May 22, 1997

[51] Int. Cl.[6] ....................................................... G06F 3/14
[52] U.S. Cl. ........................... 345/341; 345/334; 345/973
[58] Field of Search ................................... 345/341, 334, 345/339, 340, 342, 352, 973, 123, 124; 707/509, 517, 508, 518, 523

[56] References Cited

U.S. PATENT DOCUMENTS

| | | | |
|---|---|---|---|
| 5,038,138 | 8/1991 | Akiyama et al. | 345/123 |
| 5,129,056 | 7/1992 | Eagen et al. | 345/341 |
| 5,283,560 | 2/1994 | Bartlett | 345/113 |
| 5,317,306 | 5/1994 | Abraham et al. | 345/118 |
| 5,333,253 | 7/1994 | Kishihata | 345/339 |
| 5,469,540 | 11/1995 | Powers, III et al. | 345/336 |
| 5,515,497 | 5/1996 | Itri et al. | 345/340 |
| 5,550,559 | 8/1996 | Isensee et al. | 345/124 |
| 5,563,997 | 10/1996 | Fisher | 345/347 |
| 5,737,558 | 4/1998 | Knight, III et al. | 345/342 |

OTHER PUBLICATIONS

B. Gengler, et al, *Focus Based Multicolumn List Processing*, Vol. 39, No. 10, Oct. 1996, pp. 83–84.

D.K. Johnson, et al, *H–To–Hawaii Support on a Per–Column Basis in Multicolumn List Boxes*, vol. 37, No. 12, Dec. 1994, pp. 581–582.

I.R. Eisen, et al. *Multiple Lists Scrolling Together*, vol. 32, No. 6A Nov. 1989, p. 457.

*Primary Examiner*—Matthew M. Kim
*Assistant Examiner*—Crescelle N. dela Torre
*Attorney, Agent, or Firm*—Duke W. Yee; Jeffrey S. LaBaw

[57] ABSTRACT

A method and apparatus for displaying a data collection within a data processing system, wherein the data collection includes a plurality of entries. First a control layer is displayed. Next, entries from the plurality of entries in the data collection are displayed within the control layer. In response to entries within the plurality of entries being undisplayed within the control layer, a secondary layer and entries from the additional entries from the plurality of entries are displayed within the secondary layer, wherein the data collection is efficiently displayed within the data processing system.

26 Claims, 8 Drawing Sheets

| 622 600 | 624 | Details View | 626 | 628 | | 610 | 612 | 614 | 616 | 618 | 620 |
|---|---|---|---|---|---|---|---|---|---|---|---|
| | Drive D | | | | | | | | | | |
| Icon | Title | | Icon | Title | | Icon | Title | Object Cla | Real name | Size | Last write date |
| | ANSI.EXE | | | LABEL.COM | | | CONFIG.003 | Data File | CONFIG.003 | 4,862 | 7-10-95 |
| | INI.RC | | | LOG.SYS | | | LETTRT | Data File | LETTRT | 61 | 2-9-97 |
| | SPOOL.EXE | | | PSTAT.EXE | | | AUTOEXEC.STC | Data File | AUTOEXEC.STC | 427 | 12-15-94 |
| | INISYS.RC | | | TRACE.EXE | | | AUTOEXEC.PRO | Data File | AUTOEXEC.PRO | 437 | 1-7-97 |
| | LD2FIX.EXE 635 | | | SYSLOGPM.EXE | | | CONFIGTK.SYS | Data File | CONFIGTK.SYS | 6,135 | 12-20-95 |
| | XDFCOPY.EXE | | | PATCH.EXE | | | UNZ501.ZIP | Data File | UNZ501.ZIP | 105,963 | 4-22-95 |
| | ICONEDIT.EXE | | | TRACEFMT.EXE | | | TEDIT.HLP | Data File | TEDIT.HLP | 14,596 | 9-1-94 |
| | REXXTRY.CMD | | | ATTRIB.EXE | | | CDFS.IFS | Data File | CDFS.IFS | 41,795 | 9-23-94 |
| | RXSUBCOM.EXE | | | SVGATMP.BAT | | | TEDIT.EXE | Program File | TEDIT.EXE | 10,820 | 9-23-94 |
| | RXQUEUE.EXE | | | PMCONTRL.BAK | | | AUTOEXEC.BAT | OS/2 Comma | AUTOEXEC.BAT | 469 | 1-16-97 |
| | WPDSINIT.EXE | | | SORT.EXE | | | CONFIG.001 | Data File | CONFIG.001 | 2,206 | 11-21-94 |
| | PMCHKDSK.EXE | | | RCPP.ERR | | | STARTUP.CMD | OS/2 Comma | STARTUP.CMD | 134 | 5-30-95 |
| | PRINT.COM | | | RCPP.EXE | | | CONFIG.004 | Data File | CONFIG.004 | 4,725 | 12-3-95 |
| | MORE.COM | | | RC.EXE | | | CONFIG.SYS | Data File | CONFIG.SYS | 5,041 | 1-6-97 |
| | HELPMSG.EXE | | | LINK.EXE | | | ORIGINAL.SYS | Data File | ORIGINAL.SYS | 3,129 | 11-25-94 |
| | COMP.COM | | | LINK386.EXE | | | CONFIG.TCP | Data File | CONFIG.TCP | 2,935 | 11-24-94 |
| | EAUTIL.EXE | | | TUTORIAL.EXE | | | CONFIG.002 | Data File | CONFIG.002 | 2,967 | 11-24-94 |
| | REPLACE.EXE | | | OS2SYS.INI | | | CONFIG.STC | Data File | CONFIG.STC | 3,324 | 2-2-95 |
| | UNDELETE.COM | | | CACHE.EXE | | | CONFIG.000 | Data File | CONFIG.000 | 2,618 | 11-24-94 |
| | DISKCOMP.COM | | | HPFS.IFS | | | MINSTALL.LOG | Data File | MINSTALL.LOG | 210 | 11-24-94 |
| | BOOT.COM | | | RECOVER.COM | | | CONFIG.NET | Folder | CONFIG.NET | 3,407 | 2-16-95 |
| | SYSLEVEL.EXE | | | TREE.COM | | | HUMOR | Folder | HUMOR | 0 | 12-17-96 |
| | DISKCOPY.COM | | | PMCONTRL.INF 640 | | | MACCOPY | Folder | MACCOPY | 0 | 11-30-96 |
| | XCOPY.EXE | | | BACKUP.EXE | | | MACTEST | Folder | MACTEST | 0 | 11-30-96 |
| | MAKEINI.EXE | | | RESTORE.EXE | | | CODE | | CODE | 0 | 4-29-96 |

Fig. 6

METHOD AND APPARATUS FOR MANIPULATING VERY LONG LISTS OF DATA DISPLAYED IN A GRAPHICAL USER INTERFACE USING A LAYERED LIST MECHANISM

BACKGROUND OF THE INVENTION

1. Technical Field

The present invention relates generally to an improved data processing system and in particular to a method and apparatus for manipulating very long lists of data in a data processing system. Still more particularly, the present invention relates to a method and apparatus for manipulating and presenting data structures in a graphical user interface within a data processing system.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

Although GUIs have made manipulation of data easier for users in some instances, GUIs have created new problems. For example, a user working in an application frequently selects items from an application menu toolbar. This interaction will require the user to move a pointer via a mouse over a graphical object such as a menu, icon, or control to make a selection.

The term "mouse," when used in this document, refers to any type of operating system supported graphical pointing device including, but not limited to: a mouse, track ball, touch pad, light pin, touch screen, and the like. A pointing device is typically employed by a user of the data processing system to interact with the data processing system's GUI. A "pointer" is an iconic image controlled by a mouse or other such device, and is displayed on the video display device of a data processing system to visually indicate to the user icons, menus, or other types of graphical objects that may be selected or manipulated.

Graphical objects are often stored within subdirectories or folders. Often a user desires to see the contents of a folder displayed as a list, which may be displayed to a user within a window in the graphical user interface. A "detail's view" option is often available, allowing the user to see a list of detailed information about the objects stored within a folder. A "detail's view" list is often scrollable both horizontally and vertically when there are many objects for display in the folder.

When the contents of the list do not fit in the window, vertical scrolling can be used by the end-user, effectively providing a moveable window for viewing the contents of the long list. The number of entries that can be seen within a scrollable window is limited by the number of list entries that will fit within the window, as presented by the graphical user interface. Of course, the actual number of entries that will fit in the window is affected both by screen resolution and the size of the selected font. This shortage of space that occurs in the vertical dimension occurs even if space in the horizontal dimension is abundantly available (i.e. the width of the entries being viewed by the user is relatively small, and easily fits in the window).

For example, if a detailed view of the files located in a subdirectory is of interest, each entry in the list, as displayed to the user, can contain file name, file size, last write date, last write time, etc. If the number of entries in the list exceeds the capacity of the window (in the vertical dimension), the number of entries that can be displayed in the window's vertical dimension cannot be increased by changing the horizontal dimension of the window. This is true even if the user is not interested in viewing certain attributes in each entry (last write date, last write time, etc.). In other words, making the horizontal dimension of the window smaller does not increase the number of entries that can be displayed, even though this action theoretically makes more "real estate" available on the display. In practical terms, when vertical real estate on the display is used up, it is not possible to see more entries in the list, even though real estate in the horizontal dimension is plentiful. In such an instance, a smaller font or increase in screen resolution is required to see more entries under the presently available schemes for displaying objects.

Therefore, it would advantageous to have an improved method and apparatus for displaying and manipulating long lists of data in a data processing system.

SUMMARY OF THE INVENTION

It is one object of the present invention to provide an improved data processing system.

It is yet another object of the present invention to provide a method and apparatus for manipulating large amounts of data in a data processing system.

It is yet still another object of the present invention to provide method and apparatus for manipulating and presenting data structures in a graphical user interface within a data processing system.

The foregoing objects are achieved as is now described. The present invention provides a method and apparatus for displaying a data collection within a data processing system, wherein the data collection includes a plurality of entries. First a control layer is displayed. Next, entries from the plurality of entries in the data collection are displayed within the control layer. In response to entries within the plurality of entries being undisplayed within the control layer, a secondary layer and entries from the additional entries from the plurality of entries are displayed within the secondary layer, wherein the data collection is efficiently displayed within the data processing system.

According to the method and apparatus of the present invention, entries within the plurality of entries that are undisplayed in the secondary layer are displayed in a tertiary layer, and so forth, until the horizontal dimension is consumed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a window containing a layered view according to the present invention.

DETAILED DESCRIPTION OF PREFERRED EMBODIMENT

A "layered view" window is employed to display lists of information containing data that cannot be typically displayed in a single column within a display device. The present invention may be applied to any sort of data collection containing discrete elements. For example, the present invention may be applied to objects within folders, files in a directory or print jobs on a queue.

Figure 1:
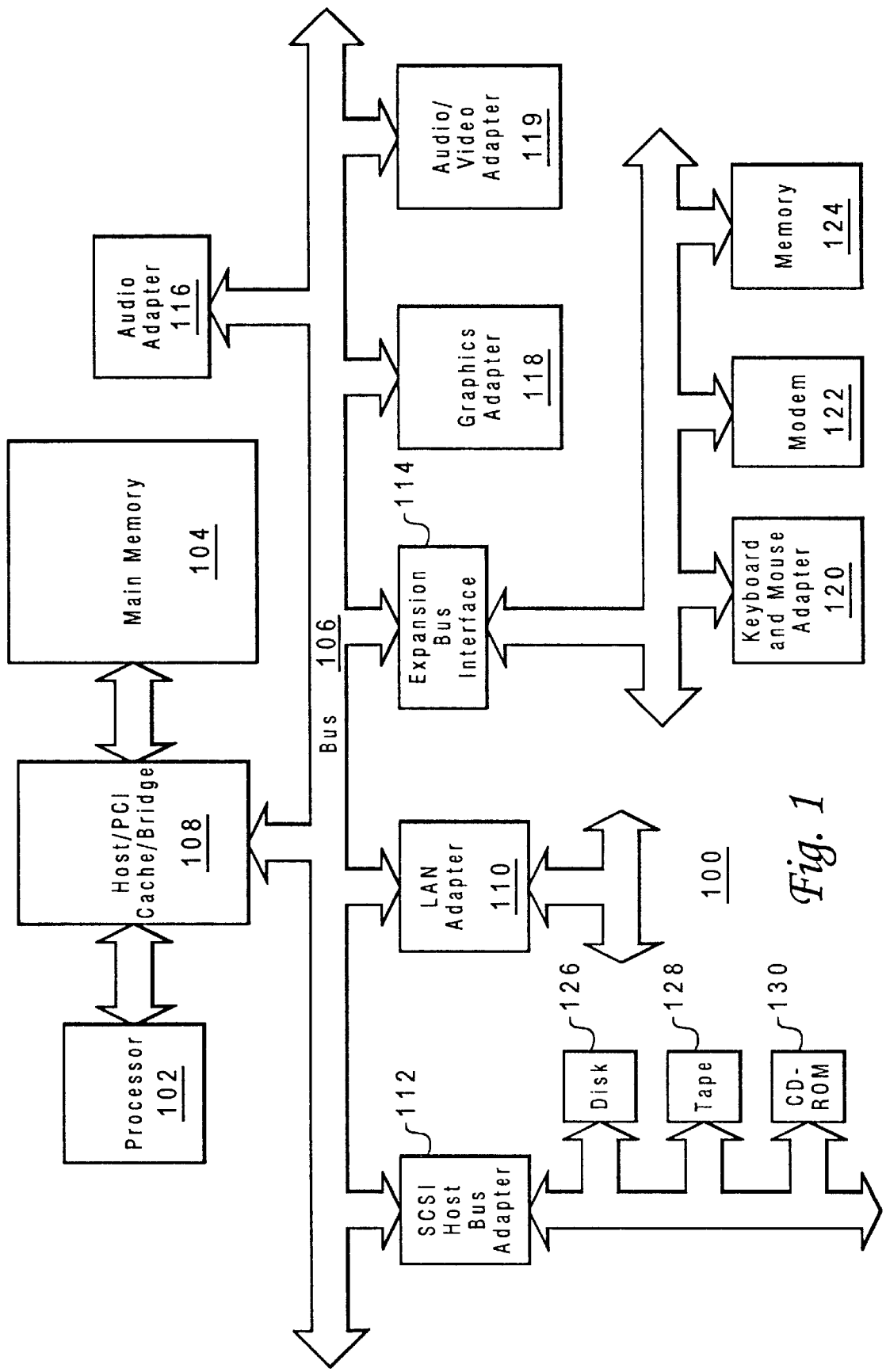
FIG. 1 is a block diagram of a data processing system in the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
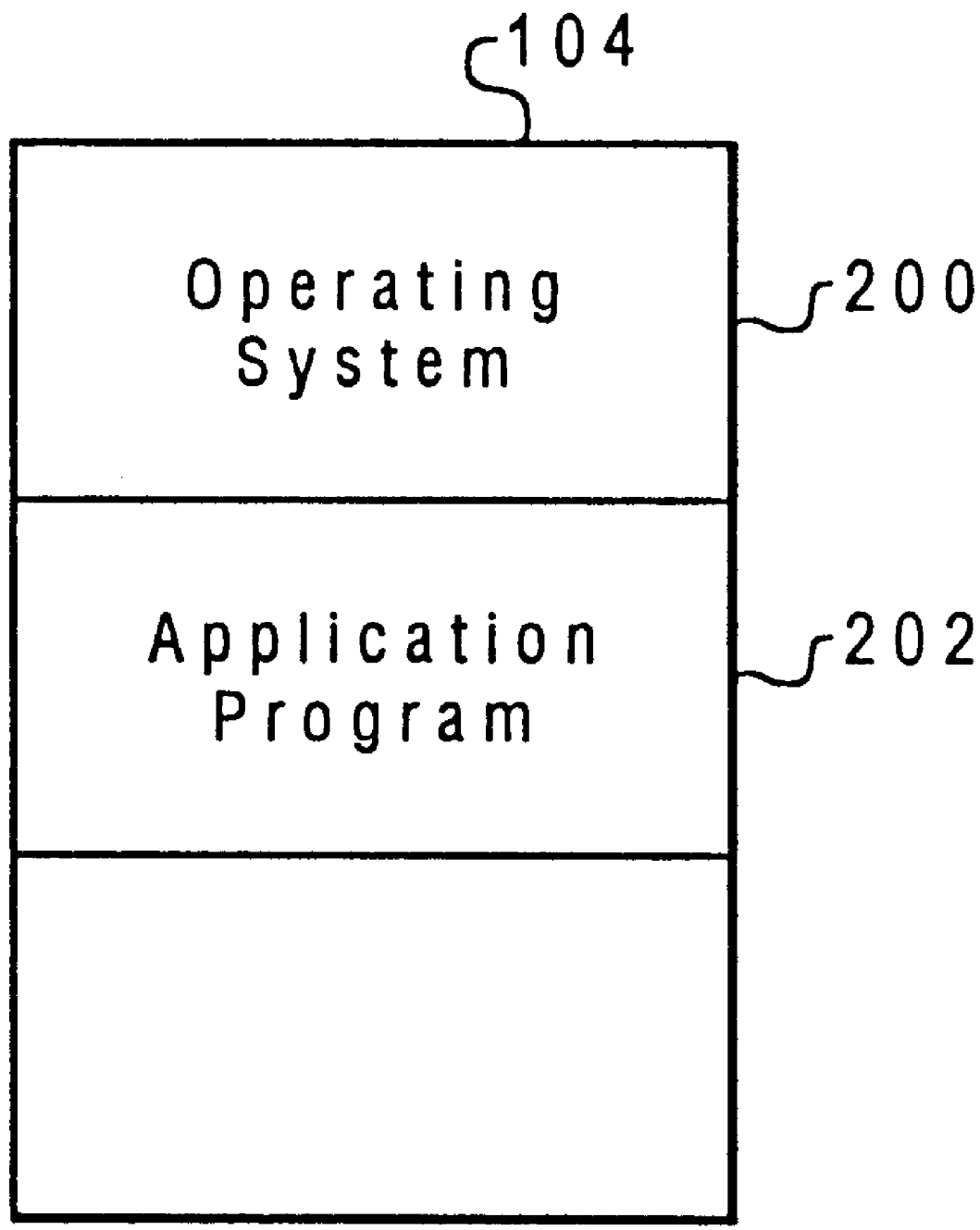
FIG. 2 is a block diagram of main memory from the data processing system in FIG. 1 according to the present invention.

With reference now to FIG. 2, a block diagram of main memory from the data processing system in FIG. 1 is depicted according to the present invention. In the depicted example, main memory 104 contains operating system software 200, which may be for example, OS/2 or Windows 95. OS/2 is available from International Business Machines Corporation while Windows 95 is available from Microsoft Corporation. Additionally, main memory 104 also contains application program 202, which is a set of instructions that are executed to provide the processes of the present invention.

Figure 3:
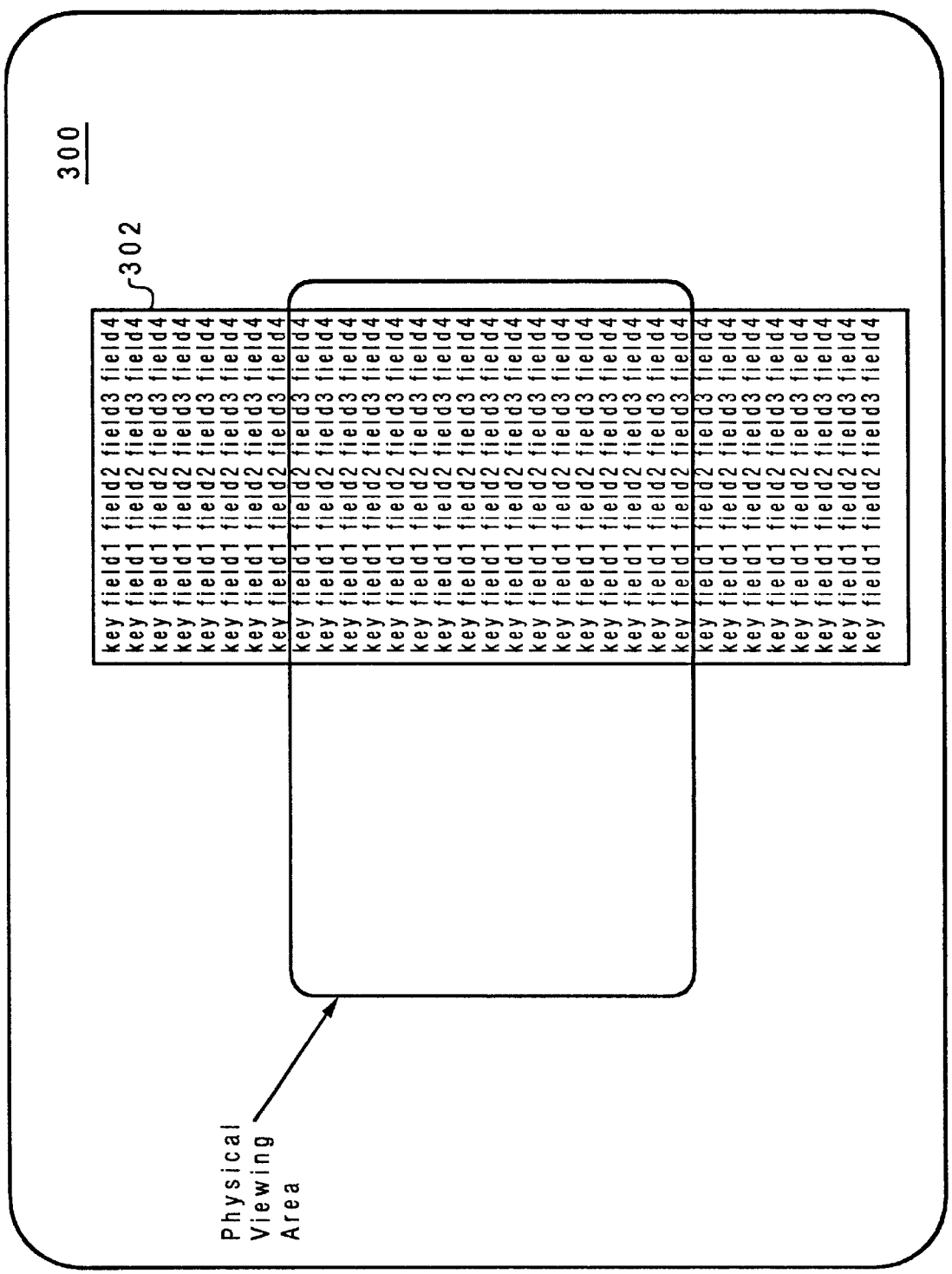
FIG. 3 is a display of a display device connected to a graphics adapter in a data processing system.

Turning next to FIG. 3, a display of a display device connected to a graphics adapter in a data processing system is depicted. Display 300 contains a window 302 displayed within a graphical user interface. Window 302 contains a long list of information in which the amount of information that can be seen is often limited by the size of the vertical dimension of window 302. This limitation forces the user to scroll up or down to see additional information.

Figure 4:
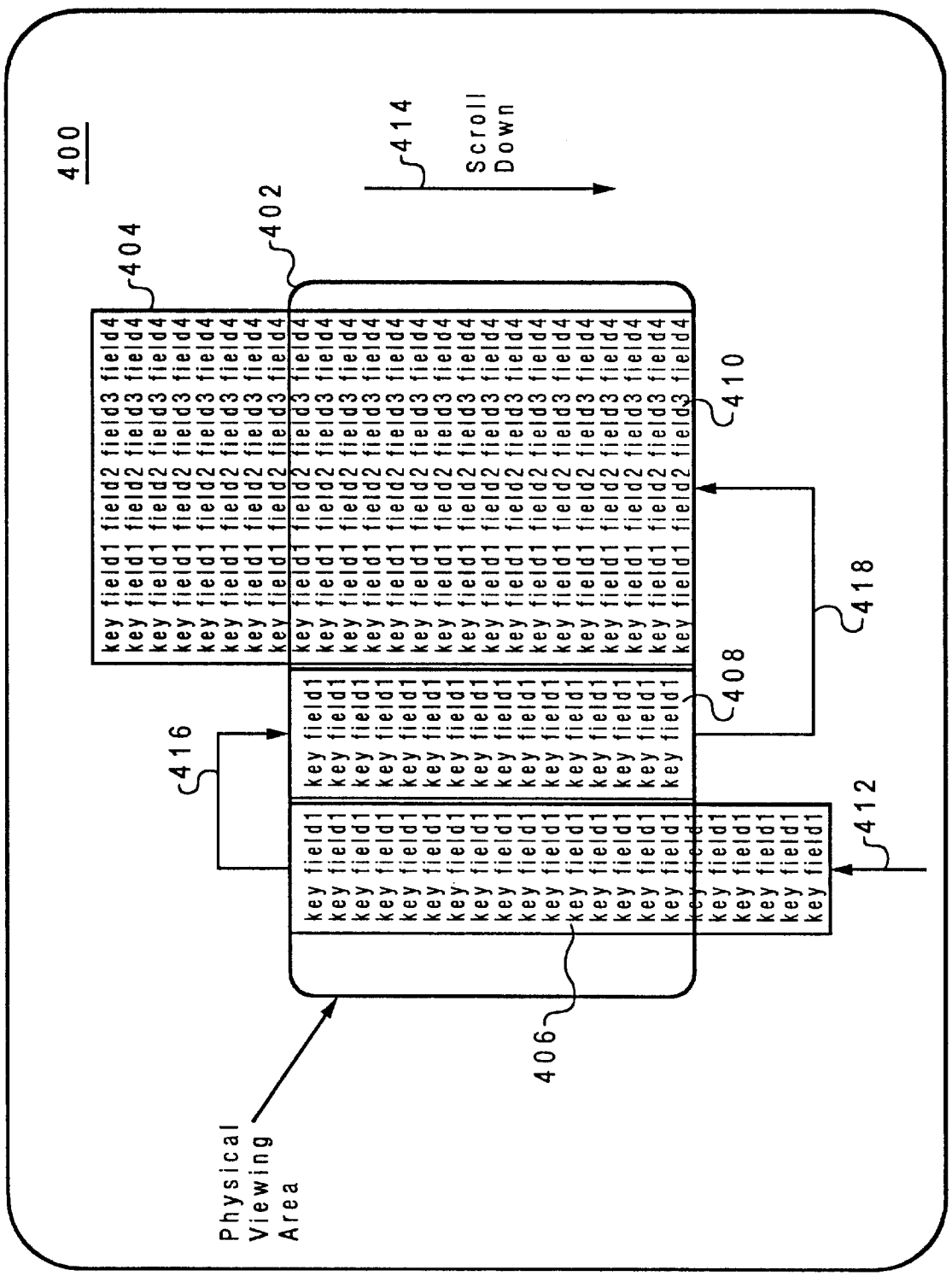
FIG. 4 is a "layered view" window according to the present invention.

Turning now to FIG. 4, a "layered view" window is depicted according to the present invention. In display 400, a layered view window 402 stacks listed information in data collection 404 in a set of cascading areas 406, 408, and 410. In window 402, a user may view all the data in area 410 and subsets of the data in areas 406 and 408. As a user scrolls through data, fields, such as field1, field2, field3, and field4, are displayed to the user in area 410 along with a key, which is typically something that uniquely identifies the entries, such as the file names of the files being displayed within the list. Data enters the viewable area in window 402 from the direction of arrow 412 into area 406 in response to the user scrolling data in a downward direction as indicated by arrow 414. As data scrolls upward in area 406, data exiting 406 at the top of window 402 appears at the top of area 408 in window 402 following the path indicated by pointer 416. As data scrolls out of view in area 408, the data is then displayed at the bottom of area 410 in window 402 in the direction indicated by arrow 418. These layered views appear to a user as a side-by-side overlapped list. As a result, more information may be simultaneously displayed in a window in the graphical user interface, allowing quicker visual scanning and a faster estimation of an ordered lists' magnitude.

Figure 5:
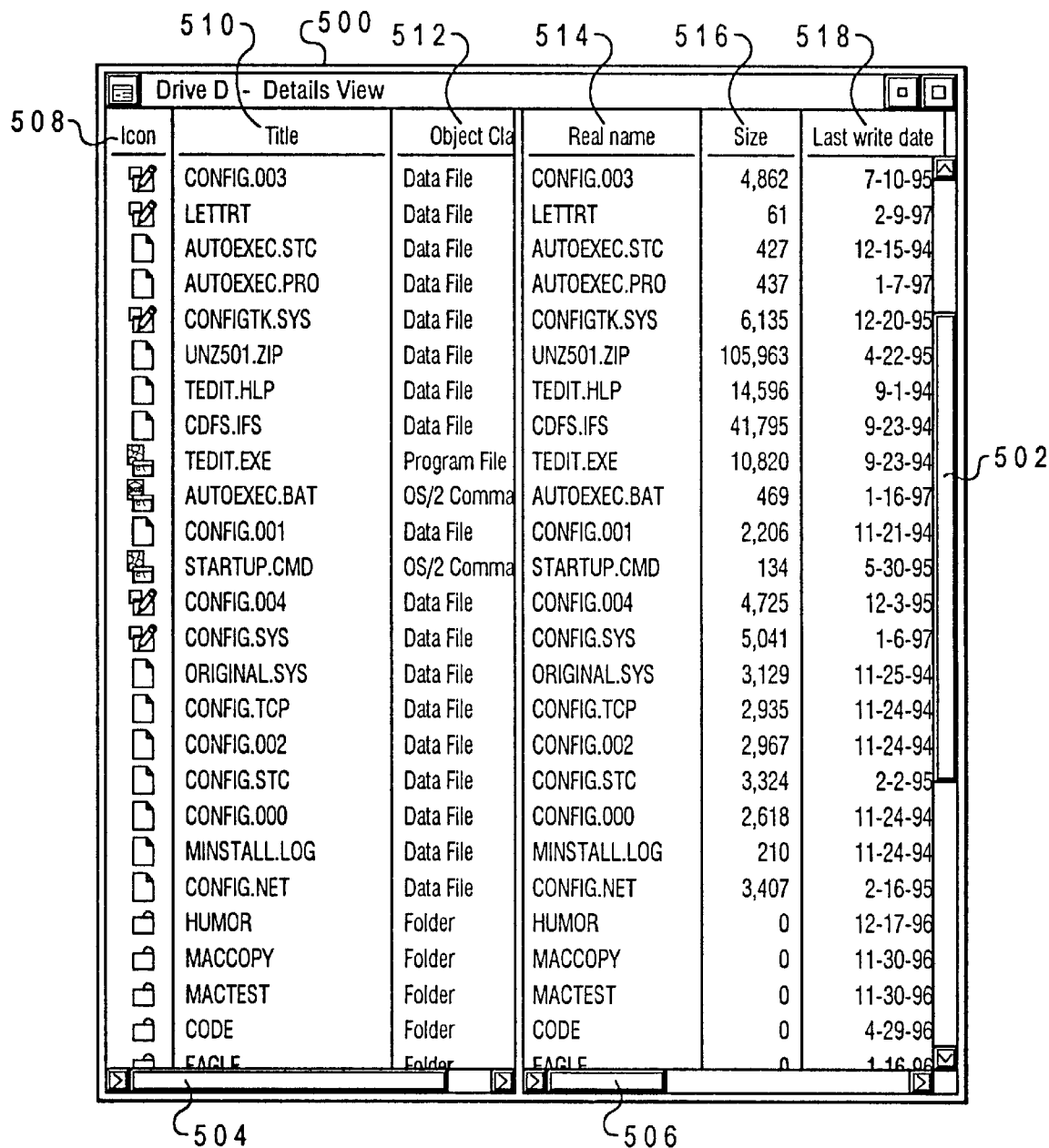
FIG. 5 is a window displaying objects in a folder according to the present invention.

Turning now to FIG. 5, a window displaying objects in a folder is depicted according to the present invention. Window 500 is an example of a "details' view" option currently available in OS/2. When a user wants to see a list of detailed information about objects in a folder or about items in a list, the user selects the view illustrated in windows 500 in FIG. 5. As can be seen, the data collection displayed in window 500 may be scrolled vertically using scroll bar 502 and horizontally using scroll bars 504 and 506. Vertically scrolling in window 500 provides a moveable window for viewing the contents of a list. In window 500, the objects or icons are displayed within icon column 508 while details of particular elements within a list are displayed in columns 510–518. The number of entries that can be seen in the scrollable window is limited by the number of entries that will fit within a single vertical list, which is affected by screen resolution and font selection.

With reference next to FIG. 6, a window containing a layered view is depicted according to the present invention. Window 600 is an example of a window displayed in OS/2 using layered views. In the depicted example, window 600 includes a control layer 602, also referred to as a primary layer. Additionally, window 600 includes two secondary layers, 604 and 606. In control layer 602, each entry in a list includes an icon column 610, a title column 612, an object class column 614, a real name column 616, a size column 618, and a last write date column 620. Other data may be displayed in place of the columns shown in control layer 602. Alternatively, additional information could be displayed depending on the amount of horizontal real estate available within the display. Secondary layer 604 includes an icon column 622 and a title column 624. Similarly, secondary layer 606 contains a icon column 626 and a title column 628.

Control layer 602 contains a "standard list". Horizontal scroll bars 630 and 632 and a vertical scroll bar 634 are displayed in association with control layer 602. The extra space to the left of control layer 602 within window 600 are used to place one or more additional secondary layers of the list, which are a continuation of the list displayed in control layer 602, also referred to as the top most window within the layers. Although in the depicted example, two secondary layers are displayed in association with the control layer, other numbers of secondary layers may be employed depending on the number of elements or objects within a data collection. In response to a manipulation to vertical scroll bar 634, data is scrolled in all of the layers displayed within window 600. This scrolling occurs in tandem. Similarly, when horizontal scroll bar 630 is manipulated, the display of layers 602, 604, and 606 are scrolled horizontally in tandem. Vertical scrolling occurs as previously described with reference to FIG. 4 above.

Additionally, if a user selects an entry from one of the secondary layers, this entry is scrolled up to control layer 602 upon selection of the entry. For example, if a user is interested in seeing more information about PATCH.EXE file 635 in secondary layer 606, the user would select PATCH.EXE file 635 with pointer 636. In response, the entire list is scrolled up such that PATCH.EXE file 635 is in a slot originally occupied by CONFIG.003 file 638, at the top of control layer 602. Alternatively, PATCH.EXE file 635 could be brought to the bottom of control layer 602 where EAGLE file 640 is currently displayed within control layer 602. In this manner, the number of entries that may be viewed in a data collection can be increased. In the depicted example, the increase in entries viewed is three times more than the presently available systems.

Figure 7:
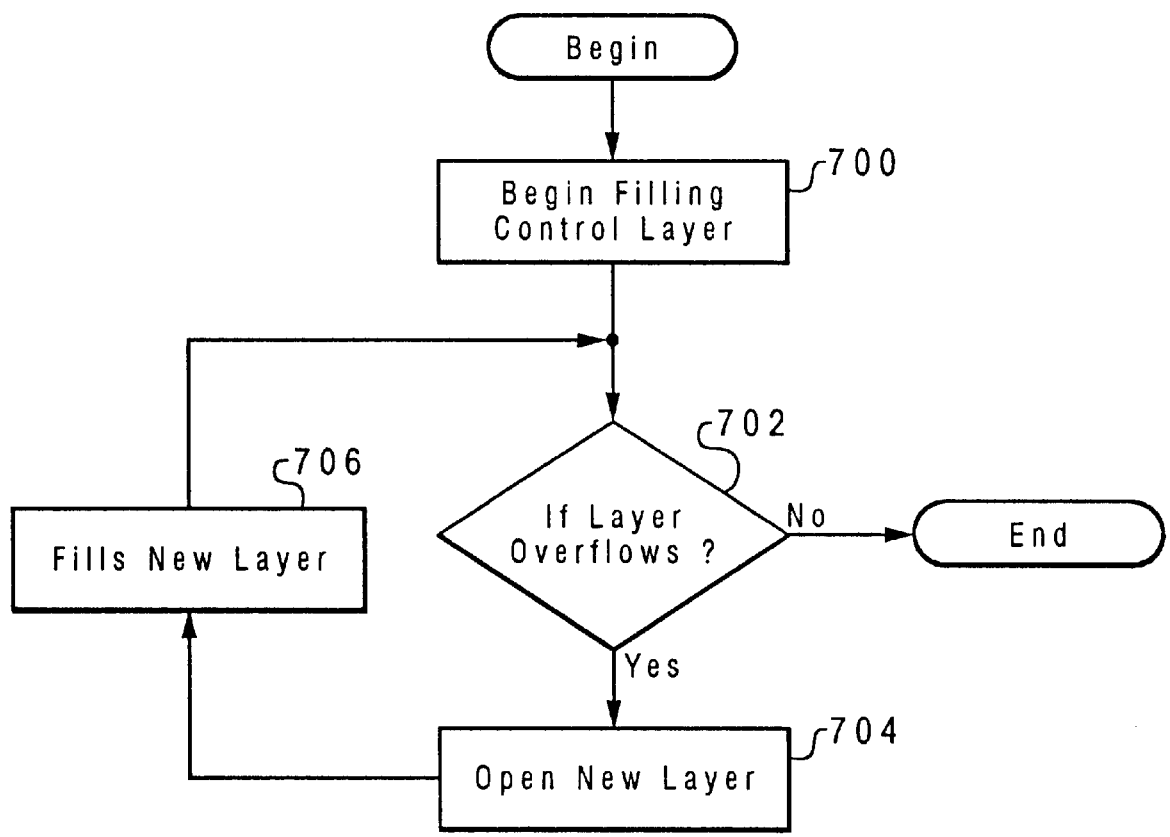
FIG. 7 is a flowchart of a process for displaying elements in a data collection according to the present invention.

Turning now to FIG. 7, a flowchart of a process for displaying elements in a data collection is depicted according to the present invention. The process begins by filling the control layer (step 700). Information about elements are displayed in the control layer of the window. Thereafter, a determination is made as to whether the layer has overflowed (step 702). If the layer has overflowed, the process then opens a new layer, a secondary layer, (step 704) with the process then returning to step 702. The new layer is displayed to one side of the control layer in the depicted example. The process then fills the new layer (step 706). The process then returns to step 702 as described above. If in step 702, the layer does not overflow, the process then terminates.

Figure 8:
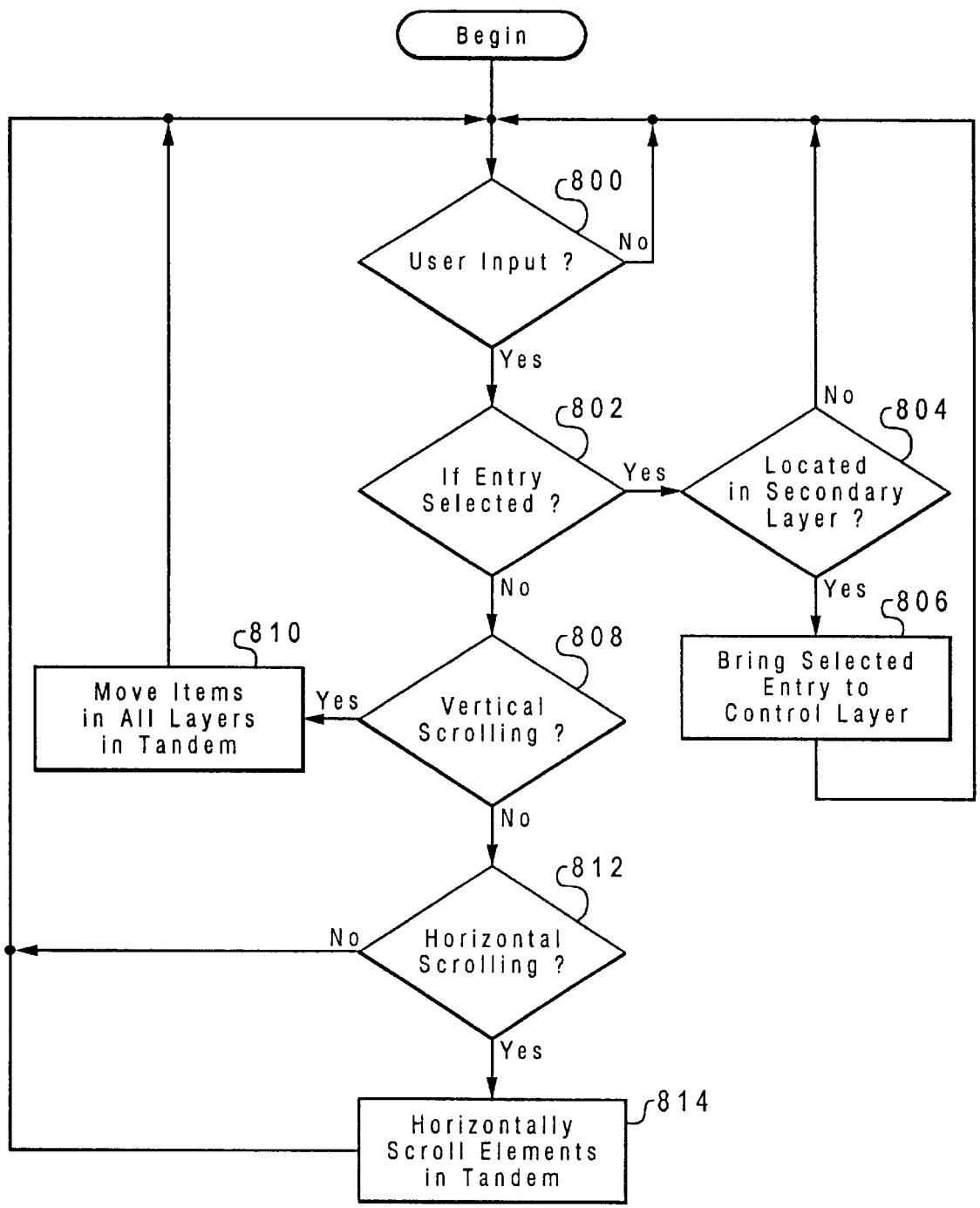
FIG. 8 is a flowchart of a process for moving the display of elements within a data collection according to the present invention.

Turning now to FIG. 8, a flowchart of a process for moving the display of elements within a data collection is depicted according to the present invention. The process begins by determining whether a user input has occurred (step 800). If no user input has occurred, the process then returns to step 800. If a user input has occurred, the process then determines whether an entry has been selected (step 802). If an entry has been selected, the process then determines whether the entry is located in a secondary layer (step 804). If the entry is located in a secondary layer, the selected entry is then brought to the control window (step 806) with the process then returning to step 800. When the selected element is displayed in a control layer, more details then become visible to the user. The process also returns to step 800 from step 804 if the selected entry is not within a secondary layer. If the selected entry is in the control layer, other normal operations may be performed on the element, such as open, delete, etc. In step 802, if an entry is not selected, the process then determines whether the user has vertically scrolled entries within the window (step 808). If the user has vertically scrolled entries within the window, all items within all of the layers are moved in tandem (step 810) with the process then returning to step 800. An element scrolls vertically within a layer until it moves out of the viewing area for the particular layer. Then the item is displayed in the entry point of the adjacent layer.

If the user has not vertically scrolled the entries, the process then determines whether the user has manipulated the horizontal scroll bar (step 812). If the user has manipulated the horizontal scroll bar, the process then horizontally scrolls elements in all of the layers in tandem (step 814) with the process then returning to step 800. If the user has not manipulated the horizontal scroll bar, the process also returns to step 800.

Thus, the present invention takes advantage of unused horizontal space within a graphical user interface to display additional elements within a data collection to a user. Thus, the present invention also provides more information to simultaneously be displayed to a user. Additionally, the present invention also displays the most meaningful information (i.e. keys or objects) at the far left to the user to allow a user to visually scan the entries in a data collection in an efficient manner.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. For example, the present invention may be applied to viewing data in many different applications, such as web browsers, which also are frequently used to visualize lists of information. That the embodiment was chosen and described in order to best explain the principles of the invention and the practical application to enable others of ordinary skill in the art to understand the invention for various embodiments with various modifications as are suited to the particular use contemplated.

We claim:

1. A method for displaying a data collection within a data processing system, wherein the data collection includes a plurality of entries, the method comprising the data processing implemented steps of:

displaying a control layer;

displaying entries from the plurality of entries in the data collection within the control layer using a first format, wherein a portion of the plurality of entries in the data collection are undisplayed within the control layer; and in response to the portion of the plurality of entries being undisplayed within the control layer, displaying a secondary layer and displaying entries from the portion of the plurality of entries within the secondary layer using a second format, wherein the data collection is efficiently displayed within the data processing system.

2. The method of claim 1 further comprising in response to undisplayed entries being present after displaying the undisplayed entries in a second secondary layer.

3. The method of claim 1, wherein the secondary layer is displayed adjacent to the control layer.

4. The method of claim 1, wherein a vertical scroll bar is displayed in association with the control layer.

5. The method of claim 1 further comprising displaying the control layer and the secondary layer adjacent to each other within a window.

6. A method for displaying a plurality of objects within a data processing system, the method comprising the data processing implemented steps of:

displaying objects from the plurality of objects within a primary layer using a first format, wherein a portion of the plurality of objects are undisplayed within the primary layer; and in response to the portion of the plurality of being undisplayed within the primary layer, displaying objects within the portion of the plurality of objects within a secondary layer using a second format, wherein some of the objects within the plurality of objects remain undisplayed.

7. The method of claim 6 further comprising in response to additional undisplayed objects being present after displaying undisplayed objects within a secondary layer, displaying additional undisplayed objects within an additional secondary layer.

8. The method of claim 6 further comprising displaying a vertical scroll bar in association with the primary layer and the at least one secondary layer, wherein all objects displayed within the primary layer and the secondary layer move in tandem in response to a manipulation of the vertical scroll bar.

9. The method of claim 8, wherein the primary layer and the secondary layer are located adjacent to each other and further comprising displaying an object, presently displayed in the secondary layer, within the primary layer in response to the object being scrolled out of the secondary layer.

10. The method of claim 6 further comprising displaying a horizontal scroll bar in association with the primary layer.

11. The method of claim 10, wherein all objects displayed within the primary layer and the secondary layer are moved in tandem in response to a manipulation of the horizontal scroll bar.

12. The method of claim 10 further comprising displaying a second horizontal scroll bar in association with the secondary layer.

13. A data processing system for displaying a data collection within the data processing system, wherein the data collection includes a plurality of entries, comprising:

first display means for displaying a control layer;

second display means for displaying entries from the plurality of entries in the data collection within the control layer, wherein the entries are displayed using a first format;

third display means, in response to other entries within the plurality of entries being undisplayed within the control layer, for displaying a secondary layer and displaying entries from the other entries within the secondary layer using a second format, wherein the data collection is efficiently displayed within the data processing system.

14. The data processing system of claim 13 further comprising in response to undisplayed entries being present, fourth display means for displaying the undisplayed entries in a second secondary layer.

15. The data processing system of claim 13, wherein the secondary layer is displayed adjacent to the control layer.

16. The data processing system of claim 13, wherein a vertical scroll bar is displayed in association with the primary layer.

17. The data processing system of claim 13 further comprising fourth display means for displaying the control layer and the secondary layer adjacent to each other within a window.

18. A data processing system comprising:

a memory;

a plurality of objects located in the memory;

a display; and a processor having a plurality of modes of operation including:

a first mode of operation in which the processor displays objects from the plurality of objects within a primary layer in a first format, wherein a portion of the plurality of objects are undisplayed in the primary layer; and a second mode of operation, responsive to the portion of the plurality of objects being undisplayed within the primary layer, in which the processor displays at least some of the portion of the plurality of objects within a secondary layer in a second format.

19. A computer program product for use with a computer for displaying a plurality of data collections within the computer, the computer program product comprising:

a computer usable medium;

first instructions for displaying objects from the plurality of objects within a primary layer using a first format, wherein a portion of the plurality of objects are undisplayed within the primary layer; and second instructions for, responsive to the portion of the plurality of objects being undisplayed in the primary layer, for displaying at least a portion of the plurality of objects within a secondary layer using a second format, wherein the instructions are embodied within the computer usable medium.

20. A method for displaying a data collection within a data processing system, wherein the data collection includes a plurality of entries, the method comprising the data processing implemented steps of:

displaying a control layer;

displaying entries from the plurality of entries in the data collection within the control layer using a first format, wherein a portion of the plurality of entries in the data collection are undisplayed within the control layer;

in response to the portion of the plurality of entries being undisplayed within the control layer, displaying a secondary layer and displaying entries from the portion of the plurality of entries within the secondary layer using a second format, wherein the data collection is efficiently displayed within the data processing system; and wherein each of the plurality of entries in the data collection includes a number of fields, the entries from plurality of entries displayed in the control layer using the first format are displayed using a first number of fields from the plurality of fields, the entries from the portion of the plurality of entries displayed in the secondary layer using a second format are displayed using a second number of fields from the plurality of fields, and the second number is unequal to the first number.

21. The method of claim 20, wherein the second number is less that the first number.

22. The method of claim 21, wherein the plurality of entries are sequentially ordered such that a display of one entry always follows a display of another entry when displayed.

23. The method of claim 22 further comprising: responsive to a selection of an entry within the secondary layer, displaying the entry within the control layer instead of in the secondary layer, wherein the entry is displayed in the control layer using the first number of fields.

24. The method of claim 23, wherein the entry is displayed in the control layer by scrolling the entry from the secondary layer into the control layer.

25. The method of claim 22, wherein the step of displaying entries comprises: responsive to a selection of an entry within the secondary layer, scrolling plurality of entries such that the selected entry enters the control layer; and displaying the entry in the control layer using the first number of fields.

26. The method of claim 25 further comprising: providing a graphical control to scroll the plurality of entries such that the entries displayed within the control layer and the secondary layer are scrolled in tandem.

* * * * *